United States Patent [19]
Keeley

[11] Patent Number: 5,844,794
[45] Date of Patent: Dec. 1, 1998

[54] ELECTRONIC DATA COMMUNICATIONS SYSTEM HAVING DATA CONSUMER DEFINING DATA TRANSMISSION STRUCTURE

[75] Inventor: Thomas M. Keeley, Brookfield, Wis.

[73] Assignee: Allen Bradley Company, LLC, Milwaukee, Wis.

[21] Appl. No.: 732,738

[22] Filed: Oct. 18, 1996

[51] Int. Cl.[6] ................................ G05B 15/02
[52] U.S. Cl. ................ 364/138; 364/131; 364/188; 364/136; 364/191
[58] Field of Search .................. 364/131, 138, 364/188, 136, 191, 132, 133, 134, 135, 146, 147, 185, 189, 190, 192, 488, 491, 578; 395/155, 140, 275, 500, 159, 161, 700

[56] References Cited

U.S. PATENT DOCUMENTS

| | | | |
|---|---|---|---|
| 4,972,365 | 11/1990 | Dodds et al. | 364/900 |
| 5,005,152 | 4/1991 | Knutsen | 364/900 |
| 5,212,631 | 5/1993 | Schmidt et al. | 364/136 |
| 5,452,201 | 9/1995 | Pieronek et al. | 364/188 |
| 5,530,643 | 6/1996 | Hodorowski | 364/191 |

*Primary Examiner*—Reba I. Elmore
*Assistant Examiner*—Ramesh Patel
*Attorney, Agent, or Firm*—Keith M. Baxter; John M. Miller; John J. Horn

[57] ABSTRACT

Multiple processing units connected along a communication link to form an industrial controller may arrange for efficient block transfer of data by isochronous methods by forwarding to a data producer a connection message including the desired data structure having the variables necessary to be transmitted in a predefined order. Upon receipt of the data structure, the data producer may program itself to collect the data into the structure and forward the data on a periodic basis dictated by the connection message to the data consumer. Changes in the data structure may thus be accommodated efficiently in a manner that is invisible to the user.

10 Claims, 4 Drawing Sheets

ELECTRONIC DATA COMMUNICATIONS SYSTEM HAVING DATA CONSUMER DEFINING DATA TRANSMISSION STRUCTURE

FIELD OF THE INVENTION

This invention relates to industrial control systems and in particular to an industrial control system exchanging data among a variety of distributed components of the industrial control system.

BACKGROUND OF THE INVENTION

Industrial controllers are specialized high-speed computers used to control industrial equipment such as automated assembly lines or machine tools to operate such equipment in accordance with a stored control program. The stored program, when executed, includes instructions to examine inputs received from the controlled equipment and to energize or de-energize outputs or actuators providing a signal to the controlled equipment.

The inputs to the industrial controller may be discrete binary signals, stored in the controller as Boolean variables, the binary signals indicating, for example, limits of process variables such as motion, temperature, time or other quantities, or the inputs may be analog measures of process variables stored in the controller as multiple bit variables such as integers or floating point variables well known in the art. Similarly the outputs of the industrial controller may be Boolean signals controlling, for example, the switching state of solid state relays or multi-bit "analog" outputs used to describe motor speeds or set point temperatures. Normally, the inputs and outputs to the industrial controller are spatially dispersed and received by separate input or output modules communicating with other components of the controller by high-speed communication links.

A fundamental difference between conventional computers and an industrial controller is the need for the industrial controller to operate on a real-time basis commensurate with the real-time operation of the controlled equipment. It is, therefore, critical that inputs and outputs transmitted to and from the industrial controller be communicated at high speed within a predictable time period. One method of ensuring reliable and prompt transmission of data among remote components of an industrial control system is with the use of an "isochronous" or scheduled protocol on the data communication link.

In one isochronous protocol, communication requires each module requesting or transmitting information on the communication link to first create a "connection" between itself and at least one other module. The process of creating a connection allocates sufficient memory within the transmitting and receiving modules to temporarily store the message and allows a before-the-fact evaluation of whether there is sufficient network bandwidth to support the message. A portion of the network bandwidth is then allocated to the connection according to a schedule of transmissions. A module transmitting a message under this isochronous protocol, for example, waits until a scheduled time period and transmits all or a portion of the message during that scheduled time period.

Generally, the speed of operation of a control system may be increased by distributing the processing capabilities of the control system among many separate processors interconnected by the communication link. In such a distributed control architecture, normally each processor will require data from other modules of the industrial controller, including data from the input or output modules. In an isochronous communication link, this sharing of data will require that each distributed processor open connections to the various modules holding the needed data. Normally there is an interest in limiting the number of connections opened, because of physical limits on the total number of connections supported by the isochronous protocol or hardware, because of communications overhead involved in creating a connection, and because of the packetization overhead on the individual messages.

For these reasons, it is known to use one module of the industrial controller as a repository for commonly used data. This module can be separately programmed as a "producer" to periodically send data to the other components ("consumers") which also require this data. The data may be collected into a single block to be sent as a single connected message, thus reducing the number of connections that need to be opened. The consumer modules are then programmed to properly interpret and divide the block of data.

Although this approach of programming data producers and data consumers to collect, transmit, and divide blocks of data uses network resources efficiently, it makes maintenance of the control system extremely difficult. Any change in the control process which requires additional data forces the user to reprogram both the data producing module which collects and transmits the data and the data consuming modules that interpret the new data being sent. If the same data is consumed by multiple modules, a change in this data also requires that each of these other modules be identified and reprogrammed. For large control systems, the reprogramming of the modules can be extremely difficult.

SUMMARY OF THE INVENTION

The present invention provides the benefits of transmissions of collected data on an isochronous network together with the ability to simply change the data structure used by the collected data without the laborious reprogramming of the modules that produce or consume that data by a programmer.

The present invention has recognized that the task of gathering data for a block transfer can be performed by an automatic, generalizable procedure programmed into the modules themselves. In particular, each module requiring data can identify that data and create an arbitrary data structure into which the data can be collected. The data structure may then be communicated to the data producing module which, working from information provided to it by the data consuming module, can program itself to collect the necessary data and transmit it. This reprogramming can be automatic whenever the control system and control program are changed or new data is required to be exchanged between modules.

More specifically, the present invention is used in an industrial controller having at least one data producing module and a data consuming module connected together by a communications link. The data consuming module is programmed to receive an application program from a user, the application program requiring data held by the data producing module. The data consuming module automatically selects a transmission structure for the required data defining an order in which the required data will be transmitted. The data consuming module then transmits a connection message over the communication link to the data producing module, the connection message indicating the required data, the transmission structure and a reporting frequency. The data producing module receives data from industrial equipment and stores the data in its memory. It also receives the connection message over the communication link, and in response, programs itself to collect the required data in the transmission structure. It then executes this program on a periodic basis according to the reporting frequency and transmits the required data in the transmission structure over a communication link to the first data consuming module.

Thus, it is one object of the invention to automate the process of gathering data needed for data exchange between modules on an industrial controller by establishing a protocol in which the data consuming module independently identifies a structure for the data and transmits the definition of this structure to the data producing module for automatic fulfillment. In this way, changes in the data structure may be accommodated invisibly to the user of the control system while at the same time providing efficient block transfer of data.

The required data may have different word lengths and the data consuming module will determine how to optimize a transmission structure to reduce a transmission time of the data over a communication link. For example, Boolean data comprising single bit values may be collected together to form bytes together fitting evenly within the allocated message size for the module.

Thus it is another object of the invention to provide a simple rule for automatically generating transmission structures for the data without the intervention of a human operator.

The data producing module may be pre-programmed to receive a second connection message over the communication link from a second data consuming module. In this case, the data producing module compares the second connection message to the first connection message and, if they are the same, transmits the transmission structure over the communication link to both the first and second data consuming modules at the requested frequency.

Thus it is another object of the invention to reduce redundant transmission of data over the communication link. By comparing connection messages, identical requests for data may be readily determined. The possibility that the connection messages are the same is enhanced by the data consuming modules using the same rules for generating the transmission structures. If the same data is required by two modules, the same data collection steps and possibly the same transmission message may be used to satisfy both requests.

The communication link may support both asynchronous and isochronous communication. In this case, the data consuming module is programmed to transmit the connection message asynchronously and the data producing module is programmed to transmit the transmission structure isochronously.

Thus it is another object of the invention to reduce the network overhead of establishing isochronous connected messages. The connection message requesting a block of data from the data producing module normally occurs relatively infrequently and yet may be lengthy. Sending it asynchronously preserves isochronous network bandwidth.

The connection message may include programming instructions for gathering the required data from the memory of the data producing module. The data producing module may use these programming instructions to program itself to collect the required data transmission structure from the memory of the data producing module at the reporting frequency.

Thus it is another object of the invention to permit this self-programming technique to be used with a relatively simple data producing module that may receive "canned" program instructions from more powerful data consuming modules.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE PREFERRED EMBODIMENT

Figure 1:
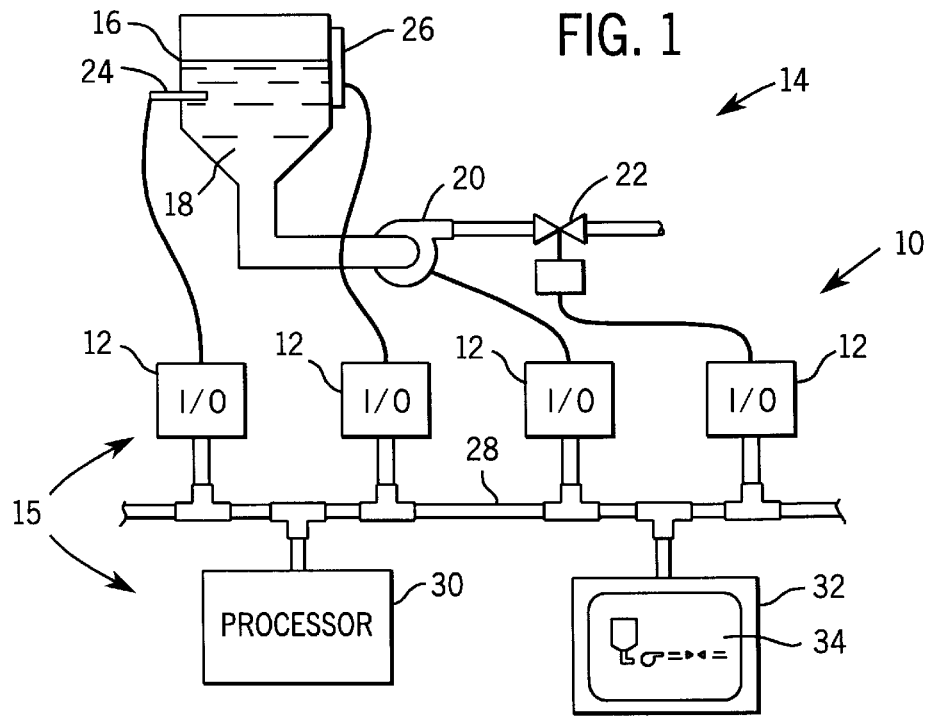
FIG. 1 is a simplified block diagram showing an industrial controller connected to control an industrial process via input/output modules communicating with each other, a processor module, and a display module on a common isochronous link.

Referring to FIG. 1, an industrial controller 10 may include a number of modules including input/output modules 12 receiving or transmitting data from or to an industrial process 14 as well as a display module 32 and a processor module 30.

As depicted, the example industrial process 14 includes a tank 16 holding liquid 18, the later which is pumped by means of pump 20 to a valve 22. The temperature of the liquid is monitored by a thermocouple 24 and the height of the liquid is monitored by a height sensor 26.

A temperature signal from thermocouple 24, a height signal from height sensor 26, a PUMP ON signal from pump 20 and a VALVE OPEN signal from valve 22 are each received by a different I/O module 12 approximate to the particular source of the signal. The I/O modules 12 are in turn each connected to a common communication link 28 which allows exchange of data between I/O modules 15, the processor 30, and the display module 32.

The processor 30, as will be described in more detail below, accepts an application program (unique to each control situation) that uses the signals from the I/O modules 12 to generate output signals (not shown), for example, to control the pump 20 according to the operation of its application program. In this process, data is transmitted between processor 30 and each I/O module 12.

The display module 32 presents an animated pictorial representation 34 of the industrial process 14 showing the state of the industrial process 13. For this purpose, display module 32 requires the data collected by the I/O modules 12 to ensure the animation matches the actual state of the controlled process. General control systems of this type and display programs for animating a pictorial representation of an industrial process are well known in the art.

Figure 2:
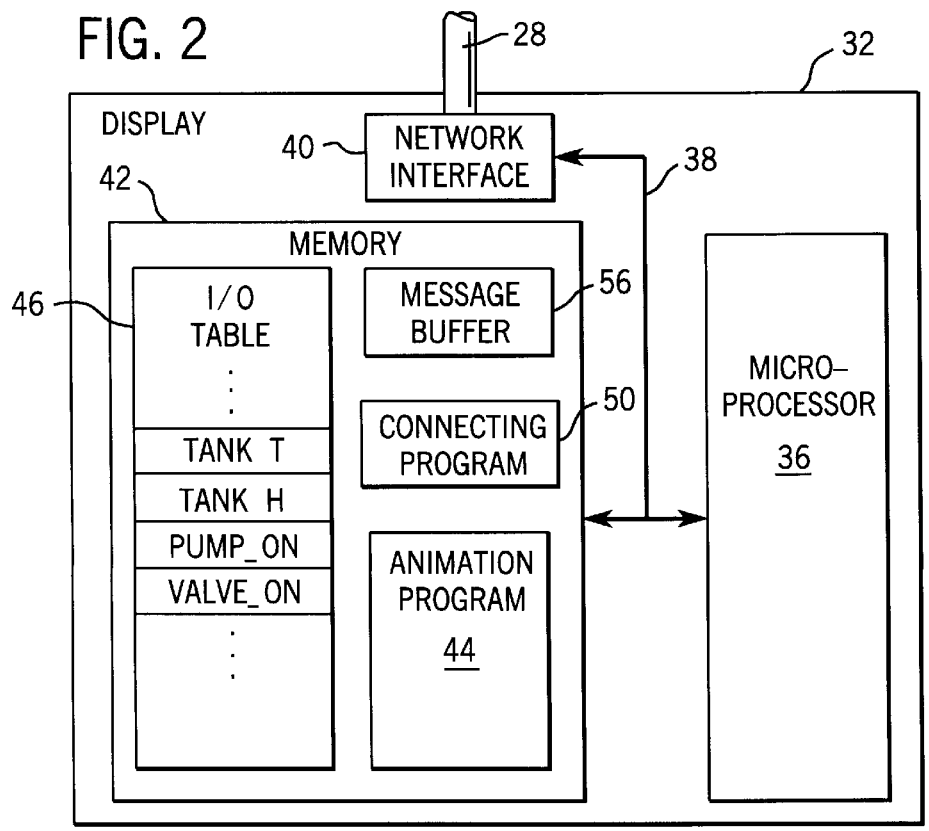
FIG. 2 is a detailed block diagram of the display module of FIG. 1 as may be programmed as a data consumer.

Referring now to FIG. 2, the display module 32 includes a microprocessor 36 communicating by an internal bus 38 with a network interface 40 connecting to the communication link 28. The network interface 40 handles low level communication protocol and electrical interface between the communication link 28 and internal bus 38 such is well known in the art and may, for example, be a CAN chip manufactured by a number of suppliers.

The microprocessor 36 also communicates with memory 42 which may be a combination of random access memory ("RAM") and non-volatile read-only memory ("ROM") well known in the art. The memory 42 holds an animation program 44 to provide the animation 34 of FIG. 1 based on data held in an I/O table 46 also in memory 42. The I/O table 46 holds a number of variables indicating the state of the controlled process and in this case four variables describing the controlled process according to the following Table 1.

TABLE 1

| Variable Name | Description | Variable Type |
| --- | --- | --- |
| TANKT | Temperature of liquid in tank 16 | Floating point |
| TANKH | Liquid level in tank 16 | Long integer |
| PUMP_ON | True if pump 20 is on | Boolean |
| VALVE_ON | True if valve 22 is on | Boolean |

Each of these variables in I/O table 46 is used by animation program 44 which reads the value of the variable from the I/O table 46. Traditionally the data of an I/O table 46 is accessed by physical address of the memory holding the I/O table 46 however, it should be understood that the present invention is applicable to other methods of addressing the data of the I/O table 46 including symbolic addressing or other addressing methods well known in the art. The following discussion will assume symbolic addressing is available and hence the data of the I/O table may be identified by a name such as TANKH.

The data for the variables of the I/O table 46 may be obtained via the communication link 28 directly from an I/O module 12 or may be obtained from another module holding that data, in this case the processor 30. To this end, generally, the display module 32 will send a message on the communication link 28 requesting updates of the variables in the I/O table 46.

Figure 3:
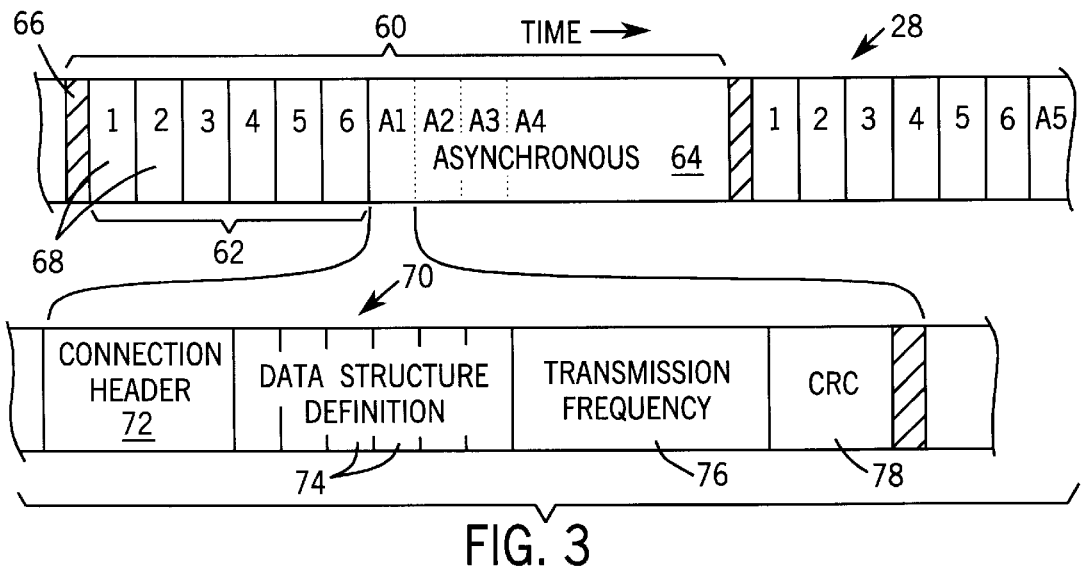
FIG. 3 is a graph plotted against time of a message transmitted on the link of FIG. 1 showing isochronous and asynchronous portions of the message such as will be used to send a connection message from the display module of FIG. 1 to the processor of FIG. 1 and blocks of data from the display module to the processor.
Figure 4:
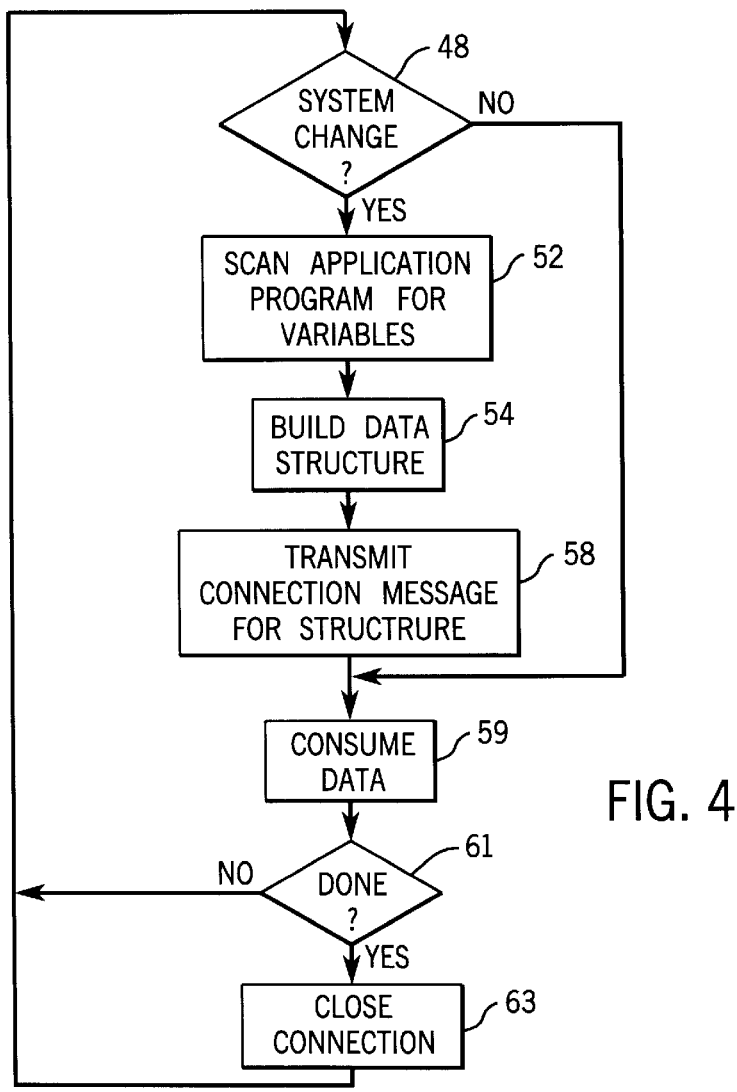
FIG. 4 is a flow chart of the steps taken by the display module of FIGS. 1 and 2 in sending a connection message requesting data from the controller of FIG. 1.

Referring now to FIGS. 2, 3 and 4, to obtain the necessary data, the microprocessor 36 of FIG. 2 initially executes a connecting program 50 also contained in memory 42. As indicated by decision block 48 of FIG. 4, the first step of the connecting program 50 determines whether an initialization of data connections between the display module 32 and other components of the industrial controller 10 is needed. Such an initialization should occur whenever there has been a change in the application program run by the industrial controller 10 or where one module requires a new set of data from another module during the course of its operation. These situations will be termed system changes.

If no system change has been made, the connection program jumps to process block 59 where the data of existing connections is consumed.

In the case where a system change has occurred, then at process block 52, the connecting program 50 scans the animation program 44 to identify the variables listed in Table 1. Only those variables requiring communication with external modules are identified.

At process block 54, the connecting program 50 builds a data structure according to a predefined rule to hold each of the variables identified and a message buffer 56 is reserved to hold the required data identified in process block 52. This building of a data structure links the message buffer 56 and the I/O table 46 so that messages coming in with the data structure will be properly placed in the I/O table 46 according to well known communication protocols. The linking requires knowledge of the order in which the required data will be transmitted and thus will appear within the data structure.

In establishing this order, the connecting program 50 follows a simple rule of placing the variables with the shortest data type first, followed by the variables with the next longest data type and so forth. Zeros are placed in bit locations within the data structure to pad out to a full transmission word depending on the protocol of the communication link 28. For several variables of same length data type, the variables are sent in reverse alphabetical order according to the labels of the data, in this case "TANKT", "TANKH", etc. In the present example, the following data structure named TANK DATA is established:

TABLE 2

TANKDATA
    TANKT: Floating point
    TANKH: Long integer
    PUMP_ON: Boolean
    VALVE_ON: Boolean Once the data structure has been established and placed in the message buffer 56, the display module 32 as indicated by process block 58 proceeds to transmit a connection message describing this structure.

Next, at process block 59 the data requested by the connection message is returned (as will be described) and consumed by the application program of the consuming module. If at decision block 61 the data of the connected message is no longer needed, the program branches to process block 63 and the connection is closed as indicated by process block 63 according to methods well understood in the art. Whether or not the connection is done, the program branches to the top of decision block 48 to look for other system changes. The invention thus contemplates that multiple concurrent connections may be opened and closed independently.

As will be understood in the art, a connection message requests a connection with another module on the communication link 28. A reply to a connection message includes a connection identification number indicating that the connection had been accepted and used as a header to subsequent messages to allow both modules to rapidly forward the messages to pre-allocated areas in the message buffers for those modules.

In the present invention, the connection message also includes the label names of the variables requested (e.g., "TANKT", "TANKH", etc.) and the transmission data structure for their transmission which is identical to the data structure shown in TABLE 2 as determined in process block 54.

The transmission of this message is directed to the data producer which may be processor 30 which holds all of the input and output data of the entire industrial controller 10.

The connection message also includes a frequency at which the data should be transmitted by the data producer so that additional connection messages need not be transmitted for each data exchange. Thus, the display module 32 may request that the data be updated every 100 msec. to ensure that the animation remains essentially current with the state of the process.

Referring now to FIG. 3 in an isochronous transmission protocol for use with a link, link transmission time may be divided into a set of transmission frames 60 which include both an isochronous portion 62 and an asynchronous portion 64. Such a transmission protocol is described in U.S. Pat. No. 5,491,531 issued Feb. 13, 1996 entitled: "A Media Access Controller for a Station on a Communications Network" assigned to the same assignee as the present invention and hereby incorporated by reference.

Generally, the isochronous portion 62 begins with a synchronization frame 66 followed by a set of predefined isochronous transmission slots 68 assigned to each module on the communication link 28. Thus each module such as I/O modules 12, processor 30, and display module 32 may be assured of a regular and repeated transmission slot 68 on the communication link 28.

The asynchronous portion 64 receives left over time after the isochronous transmissions and is assigned to particular modules on the communication link in a rotating fashion. Unlike the isochronous portion 62, communication during the asynchronous portion 64 for a given module cannot be assured within a given time window. The asynchronous portion 64 for the display module 32 is used for the connection message 70 transmitted by the display module 32.

The connection message 70 includes a connection header 72 following the particular protocol of the communication link 28 and which serves to request that a connection be made for the data that follows between the modules. The connection header 72 is followed by the data structure definition 74 in the order of their data structure (shown in TABLE 2) as has been established by the display module 32 according to process block 54. Each of these variables includes the label name for the variable, such as TANKT and the variable type as provided above in Table 1.

Following the data structure definition 74 is a transmission frequency 76 as has been previously described which indicates how frequently the data must be collected and transmitted. Finally, a compressed version of the data structure definition 74 of the connection message 70 is contained in a cyclically redundant code CRC 78 which uses a well known algorithm to compress the data of the connection message 70 such as is normally used for error correction techniques. This CRC code 78 provides a short hand means of comparing different connection messages as will be described below. Such CRC coding techniques are well known in the art. An example is referred to in Federal Information Processing Standards Publication 71 (May 14, 1980) hereby incorporated by reference.

Figure 5:
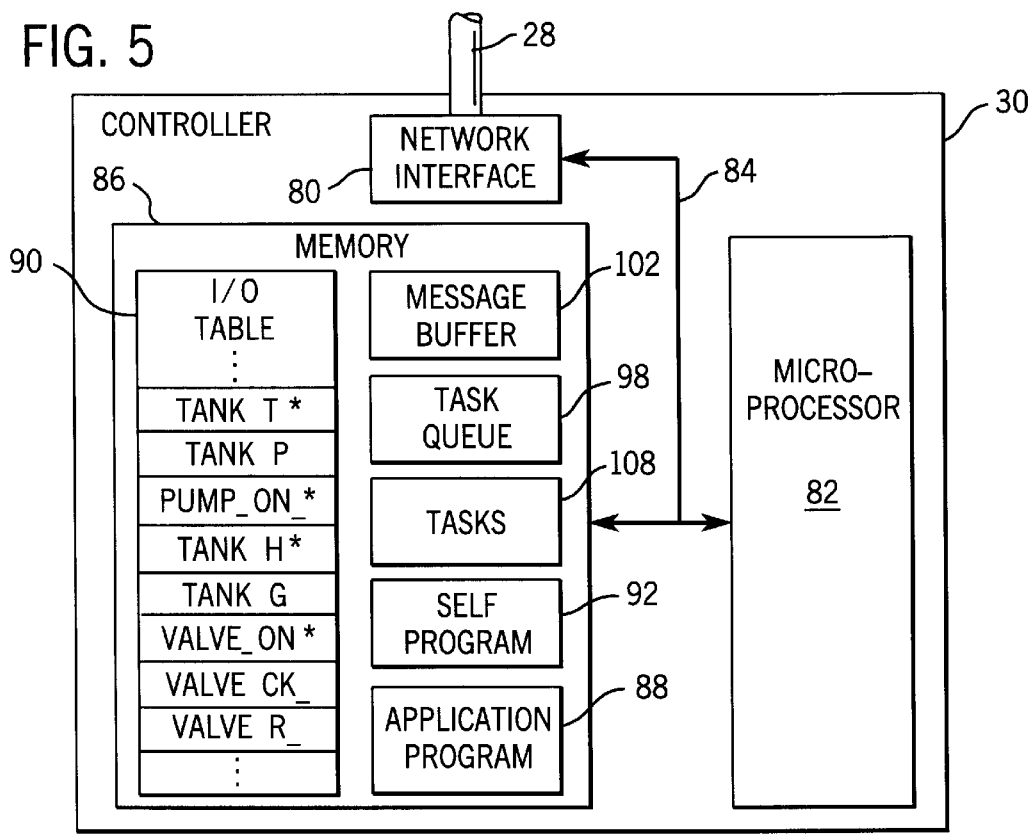
FIG. 5 is a figure similar to that of FIG. 2 showing the controller of FIG. 1 such as may be programmed as a data producer.

Referring now to FIG. 5, the processor 30 is also connected to the communication link 28 by a network interface 80 substantially the same as the network interface 40 referred to above. The network interface 80 again connects to an internal microprocessor 82 by means of an internal bus 84. The bus 84 also connects to a memory 86.

The processor 30, in this example, serves as a central repository of all data on the industrial controller 10 which enables it to efficiently process the application program 88, the latter which is the control program for the industrial equipment 14. The application program 88 requires all inputs and outputs relevant to the control task and thus communicates with an I/O table 90 holding all input and output variables used in the control process. As a result, the processor 30 is thus the most efficient data producing module for other modules.

In an alternative embodiment, the data can be held in a central data bank or in multiple modules. In this case, multiple messages will obtain the needed data.

Referring to the I/O table 90, eight system variables are shown, generally more than those required by the display module 32. In order to distinguish between the data at the data producing module and data consuming modules in the following description, the variables in I/O table 90 have an added '*', as provided in Table 3. In practice, variables holding the same data will have the same labels throughout the industrial controller.

TABLE 3

| Consumer Label | Producer Label |
| --- | --- |
| TANKT | TANKT* |
| TANKH | TANKH* |
| PUMP_ON | PUMP_ON* |
| VALVE_ON | VALVE_ON* |

Figure 6:
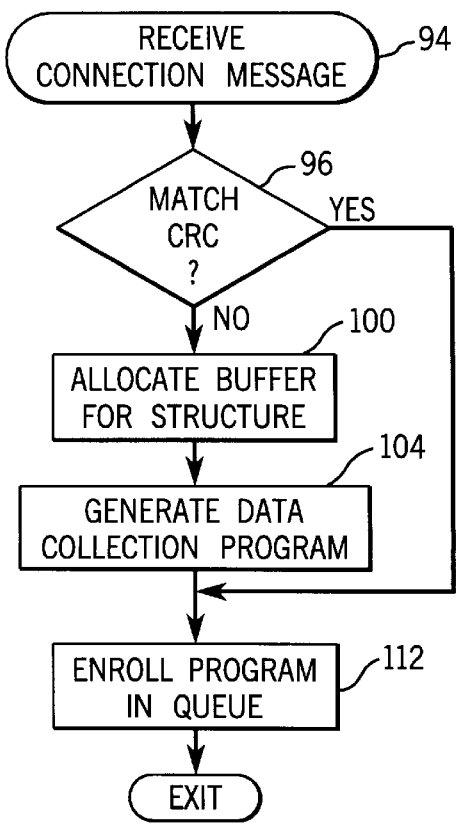
FIG. 6 is a figure similar to that of FIG. 4 showing the programming of the controller of FIGS. 1 and 5 in responding to the connection message by the display module.

Referring now to FIGS. 5 and 6, the memory 86 of the processor 30 also includes a self-programming program 92 activated by a connection message 70 whose receipt is indicated by entry block 94 in FIG. 6. As was discussed with respect to FIG. 3, the connection message 70 includes a connection header 72, a data structure definition 74, a transmission frequency 76, and a CRC 78.

After receipt of the connection message 70, at decision block 96 of program 92, the CRC 78 of the incoming connection message 70 is compared to the CRC's all current connections being serviced by the processor 30. These CRC's are held in a program element queue 98 in memory 86 as will be described below.

The purpose of comparing the CRC 78 of the incoming connection message 70 to the CRC's of the existing connections is to see if the data requested in the current connection message 70 is the same as data previously requested in another connection now being serviced.

If the CRC's match, the entire connection message 70 of the incoming connection is compared to the connection messages associated with the stored CRC that matched. Only the first matching connection message is stored in memory 86.

If the current connection message 70 in its entirety matches a previous connection message of a currently executed connection, then there is no need to generate new data gathering programs for the current connection message but previously established data gathering programs may be used. Accordingly, the program 92 branches forward to process block 112 as will be described below.

Assuming instead, that the new connection message 70 requests data, a combination of which has not been previously requested, the program 92 as shown in FIG. 6 proceeds to process block 100. At this process block 100, the program 92 allocates space for the data requested and in particular for the data structure of the data structure definition 74 in a message buffer 102 similar to message buffer 56 previously described.

Next, at process block 104, the processor 30 generates a data gathering program for gathering the data of the data structure definition 74 into the order and structure dictated by the data structure definition 74. This gathering process involves moving data from the I/O table 90 into the message buffer 102 in the order dictated by the data structure definition 74 of the connection message 70 and is done by creating a program element placed in a program element area 108 in memory 86 to be periodically executed.

Figure 7:
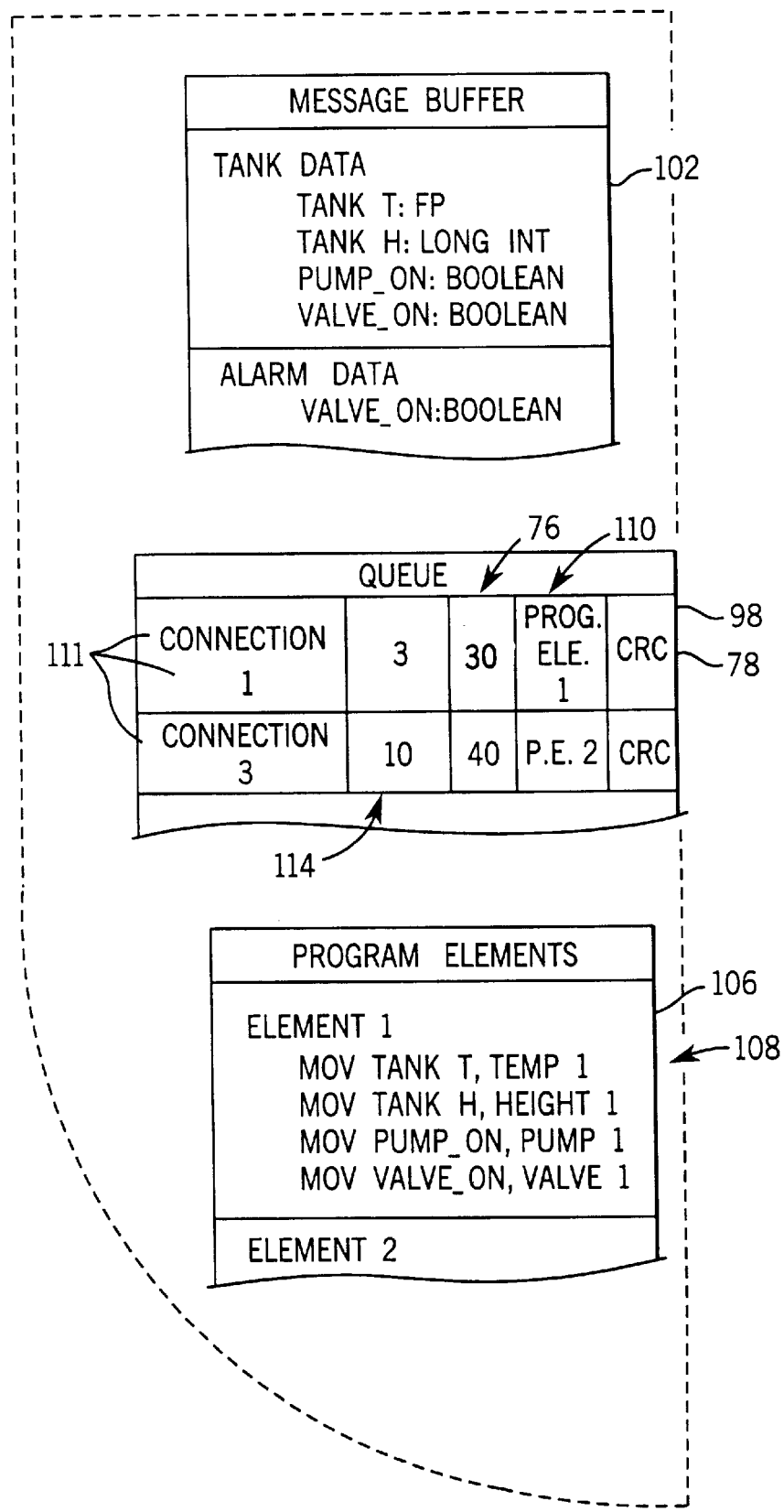
FIG. 7 is a detailed representation of the memory of the controller of FIG. 5 showing a memory structure generated in response to a connection message.

Referring now to FIG. 7 in the present example, the processor 30 executing program 92 after receipt of connection message 70 generates a short program 106 designated as PROGRAM ELEMENT 1 to be stored in the program element area 108. PROGRAM ELEMENT 1 consists of a series of four MOV instructions, such as are well known in the art, moving variables from the I/O table 90 into the allocated area of message buffer 102. In particular, the variable TEMP 1 is moved to the variable TANKT in the data structure of message buffer 102, TANKH* is moved to TANKH, PUMP_ON* is moved to PUMP_ON, and VALVE_ON* is moved to VALVE_ON.

This short program 106 of PROGRAM ELEMENT 1 is placed in the program element area 108 and a pointer 110 to the program 106 is placed in the program element queue 98 per process block 112 of FIG. 6 together with a connection identification number 111 for the particular connection as is understood in the art. The program element queue 98 provides an effective list of the currently active connections between the processor 30 and other modules.

If as was previously mentioned at decision block 96, the CRC 78 of the incoming connection message 70 matched with a CRC in the program element queue 98, the program 92 branches to the top of this process block 112 and the same connection identification number 111 for this element is sent to the new data consuming module. Thus one program element 106 may be used to satisfy two requests for data for two data consuming modules by using one connection identification number 111. In a second embodiment shown in FIG. 7, if the two connection messages 70 request different transmission frequencies 76 they will have the same CRC and a match will be permitted. In this case, the data requested will be broadcast at the higher transmission frequency 76. In this manner, redundant data is not transmitted over the link improving the capacity of the link to carry other important data.

Referring still to FIG. 7, after a program element 106 has been prepared and enrolled in the queue 98, the transmission frequency 76 (in the form of a time period value), is also added to the program element queue for the enrolled program element as is the CRC 78. This later CRC 78 will be used to compare against future incoming connection messages whereas the transmission frequency 76 is used to trigger execution of the program element.

During operation of the processor 30, a timing value 114 for each connection of the queue 98 is initially set to the time period value dictated by the desired transmission frequency 76 for each connection. At regular intervals, the timing value 114 is decremented. Any timing value that decrements to zero triggers the execution of their corresponding program element indicated by the pointer 110. The timing value is then restored to the time period value dictated by the transmission frequency 76.

For example, referring to connection 1 which has a time period value of 30, 30 is placed in the column of timing values 114 as representing the greater transmission frequency 76. When this timing value 114 is decremented to a value of zero as shown, PROGRAM ELEMENT 1 is triggered by executing the program element 106 contained in the program element area 108. In this case, the execution of PROGRAM ELEMENT 1 results in the message buffer 102 receiving the data structure dictated by the program element and previously provided by a connection message.

In particular, the data structure denominated TANK DATA is updated including the variables: TANKT, TANKH, PUMP_ON, and VALVE_ON in that order. The final step of execution of PROGRAM ELEMENT 1 pointed to by the queue 98 is restoring the timing value 114 to the transmission frequency value 76 and a triggering of the transmission of the contents of the message buffer in isochronous fashion back to the requesting data consumers, in this case, the display module 32 and a second unspecified device. Transmission of the contents of the message buffer 102 on a communications link is according to methods well-known in the art and is handled by the network interface 80 which places the data of the message buffer 102 within one of the time slots 68 previously described together with the connection identification number identifying the message for the receiving display modules 32.

In an alternative embodiment, the data structure definition 74 described with respect to FIG. 3 in the connection message 70 may include the actual program element 106. In this case, the processor 30 may simply load the program element 106 into the program element area 108.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

I claim:

1. An industrial controller controlling industrial equipment, the industrial controller comprising:
    a data producing module and a first data consuming module connected by a communications link;
    the first data consuming module having memory and a processor executing a program stored in memory to:
        (i) receive an application program from a user, the application program requiring data held by the data producer;
        (ii) select a transmission structure for the required data, the transmission structure defining an order in which the required data will be transmitted;
        (iii) transmit a connection message over the communications link to the data producing module indicating the required data, the transmission structure and a reporting frequency;
    the data producing module having memory and a processor executing a program stored in memory to:
        (i) receive data from the industrial equipment and store the data in the memory of the data producing module;
        (ii) receive the connection message over the communications link;
        (iii) program itself to collect the required data in the transmission structure from the memory of the data producing module at the reporting frequency; and (iv) execute the program on a periodic basis according to the reporting frequency and transmit the required data in the transmission structure over the communications link to the first data consuming module.

2. The industrial controller of claim 1 wherein the communications link supports both asynchronous and isochronous communications and wherein the data consuming module is programmed to transmit the connection message asynchronously and the data producing module is programmed to transmit the transmission structure isochronously.

3. The industrial controller of claim 1 including also:
an input module receiving data from the industrial equipment, the input module having memory and a processor executing a program stored in memory to transmit the required data to the data producing module for storage in the memory of the data producing module.

4. The industrial controller of claim 1 wherein the required data has different word lengths and wherein a data consuming module is programmed to select the transmission structure to reduce a transmission time of the data in the transmissions structure over the communications link.

5. The industrial controller of claim 1 wherein the required data is selected from the group consisting of integer data, Boolean data, and floating point data.

6. The industrial controller of claim 1 wherein the data producing module is further programmed to
(iv) receive a second connection message over the communications link from a second data consuming module;

(v) compare the second connection message to the connection message from the first data consuming module, and
when they are the same, at step (iii) transmit the transmission structure over the communications link to the first and second data consuming module at the reporting frequency.

7. The industrial controller of claim 6 wherein the comparison of paragraph (u) first compares a compressed form of the second connection message to a compressed form of the connection message, and if the compressed forms match, then compares the second connection message to the connection message.

8. The industrial controller of claim 7 wherein the compressed forms are cyclically redundant codes produced from a second connection message to the connection message of the first data consuming module.

9. The industrial controller of claim 6 wherein the data producing module also transmits the transmission structure over the communications link to the first and second data consuming modules at the reporting frequency when the second connection message differs from the connection message from the first data consuming module only in reporting frequency.

10. The industrial controller of claim 1 wherein the connection message also includes instructions for gathering the required data from the memory of the data producing module and wherein the data producing module uses these instructions at (iii) in programming itself to collect the required data in the transmission structure from the memory of the data producing module at the reporting frequency.

* * * * *